(12) United States Patent
Saitoh

(10) Patent No.: US 7,406,218 B2
(45) Date of Patent: Jul. 29, 2008

(54) FBG SENSOR SYSTEM

(75) Inventor: Takanori Saitoh, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 0 days.

(21) Appl. No.: 11/810,656

(22) Filed: Jun. 6, 2007

(65) Prior Publication Data

US 2007/0297721 A1 Dec. 27, 2007

(30) Foreign Application Priority Data

Jun. 9, 2006 (JP) ............... 2006-161533

(51) Int. Cl.
*G02B 6/00* (2006.01)
*G02B 6/34* (2006.01)
(52) U.S. Cl. .................. 385/12; 385/37
(58) Field of Classification Search .......... 385/12

See application file for complete search history.

(56) References Cited

U.S. PATENT DOCUMENTS 5,210,409 A * 5/1993 Rowe ............... 250/227.18
6,510,256 B1 * 1/2003 Asseh et al. ............. 385/10

* cited by examiner

*Primary Examiner*—Frank G Font
*Assistant Examiner*—Mary A El Shammaa
(74) *Attorney, Agent, or Firm*—Greer, Burns & Crain, Ltd.

(57) ABSTRACT

An FBG sensor system which has a wavelength-tunable light source for emitting light wavelength-swept at a predetermined sweep period, a photodetector for receiving reflected light of measurement light directed to be incident on an optical fiber including an FBC, a processing unit for measuring the wavelength of the reflected light received by the photodetector, and optical pulse generator means that generates a pulse having a predetermined period in synchronism with the sweep period in order that the light from the wavelength-tunable light source is converted into an optical pulse. The sweep period is such that a receipt time of the reflected light in the photodetector is after termination of incidence of the optical pulse on the optical fiber. The predetermined period of the pulse is such that an incidence time for a next optical pulse is after the receipt of the reflected light in the photodetector.

6 Claims, 9 Drawing Sheets

FIG. 6A
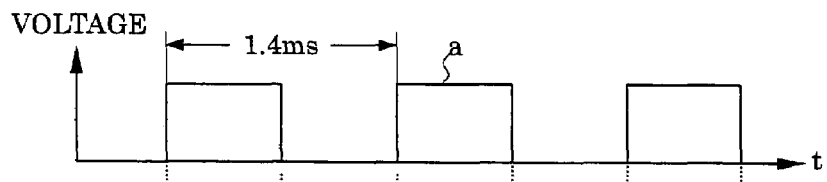
FIG. 6B
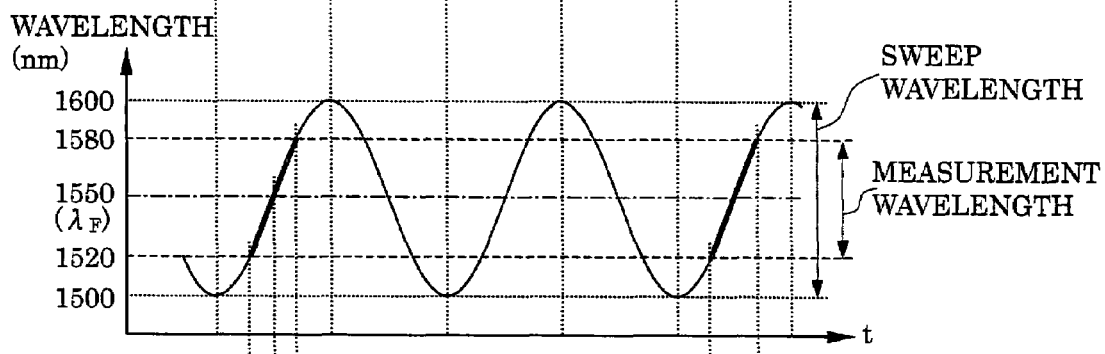
FIG. 6C
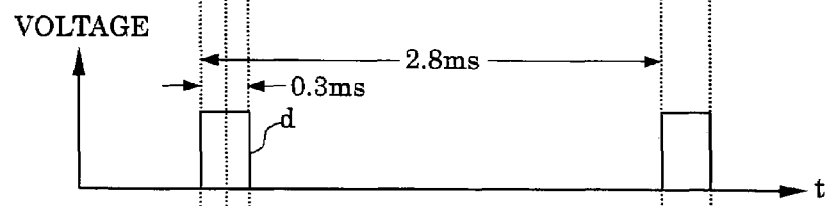
FIG. 6D
FIG. 6E
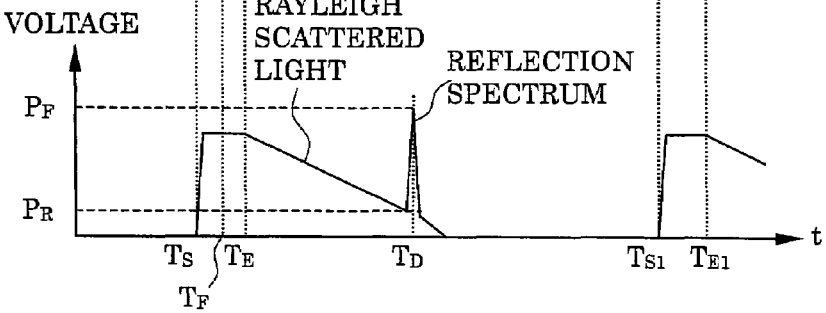
FIG. 6

FIG. 10
FIG. 10A
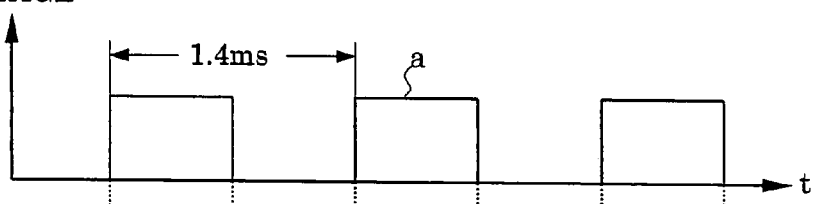
FIG. 10B
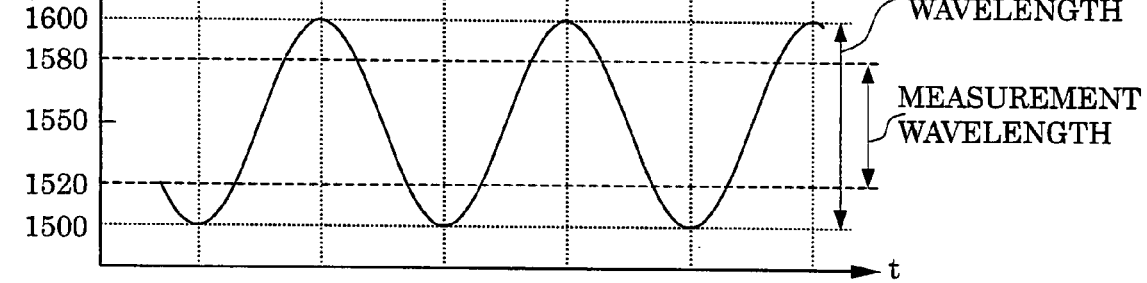
FIG. 11
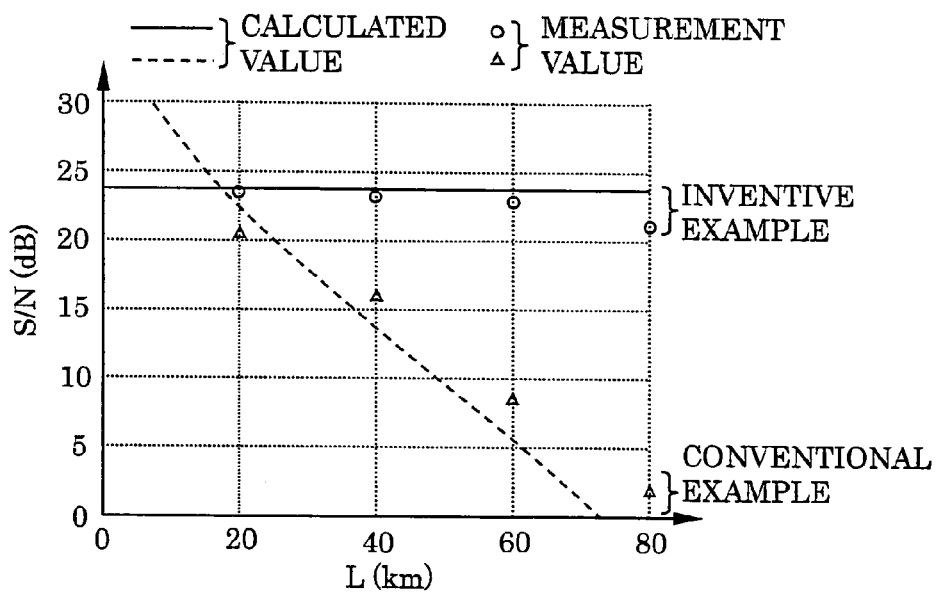

FBG SENSOR SYSTEM

BACKGROUND OF THE INVENTION

1. Field of the Invention

The present invention relates to a fiber Bragg grating (FBG) sensor system configured by combining a wavelength-tunable light source capable of fast wavelength sweep and a photodetector with an FBG provided to a measurement object at a remote site via a fiber, thereby to perform, for example, distortion measurement and temperature measurement of a measurement object of interest. More specifically, the invention relates to an FBG sensor system capable of performing accurate measurement of the measurement object even when the length of fiber to the FBG exceeds 80 km in the manner that the influence of Rayleigh scattered light occurring in a fiber is reduced by using optical pulses for measurement light incident on the FBG.

2. Description of the Related Art

An FBG is formed by varying a refraction index of a core portion of a predetermined length of a fiber periodically at a fixed interval. When incident light is received at one-end portion of the FBG, only a specific wavelength ("Bragg wavelength", hereinbelow) of the incident light is reflected, and light parts of other wavelengths are transmitted. The Bragg wavelength is variable depending upon or corresponding to an axial distortion (compression or expansion) introduced to the portion where the refraction index periodically varies at the fixed interval. Therefore, the distortion imposed on the FBG can be measured by measuring the wavelength (reflection wavelength) of light incident on the one-end portion of the FBG or the wavelength of transmissive light.

Conventionally known FBG sensor systems for performing distortion measurement, temperature measurement, and the like by using the properties of the FBG as described above include those of the type formed by combining a Littmann wavelength-tunable light source and a photodetector to measure the reflection wavelength of the FBG. In recent years, the applicant of the present invention has proposed an FBG sensor system that, in lieu of the Littmann wavelength-tunable light source, uses a MEMS (Microelectromechanical Systems) scanner using a wavelength-tunable light source enabling fast wavelength sweep, thereby to increase the measurement speed (see Japanese Patent Application Laid-Open (JP-A) No. 2006-49785). The MEMS scanner is a scanner formed from a microelectromechanical structure (structure mechanically operating under control of an electric signal).

FIG. 12 shows an overall configuration of the conventionally proposed FBG sensor system using the wavelength-tunable light source, shown by reference numeral 10, which enables the fast wavelength sweep. In the wavelength-tunable light source 10, light emitted from an AR-coated facet (AR: anti-reflection) of a semiconductor laser (LD) 1 is converted by a collimating lens 2 to collimated light, and is directed to be incident on a diffraction grating 3. Then, diffracted light of the incident light, which has been output from the diffractive grating 3, is incident on a MEMS scanner 60. The MEMS scanner 60 is configured from a reflector 35 and reflector driving means 50. The diffracted light of the collimated light incident from the diffractive grating 3 is reflected off of a reflective surface of the reflector 35 to the diffractive grating 3 and is diffracted again by the diffractive grating 3, and the diffracted light thus obtained is incident on the LD 1 through the collimating lens 2. In this case, the reflector driving means 50 works such that the angle of the reflective surface of the reflector 35 is reciprocally rotated in a predetermined sweep period so that the diffracted light incident on the LD 1 becomes light of a desired wavelength and the desired wavelength including a predetermined wavelength range is reciprocally swept.

According to the configuration described above, wavelength-swept light is oscillated and output from a non-AR-coated facet to function as output light (measurement light). The reflector driving means 50 itself generates a drive signal (determining the wavelength range and the sweep period) to reciprocally rotate the angle of the reflective surface of the reflector 35, and outputs the drive signal as a sweep signal "a" to a processing unit 17.

Zero order light from the diffractive grating 3 is incident on an optical resonator 4 of an etalon or the like, and only light of a predetermined wavelength is transmitted therethrough. The transmitted light is then converted by a photodetector (PD) 5 to an electric signal b, and is then output to the processing unit 17. More specifically, transmitted light at a predetermined wavelength interval of, for example, 15 GHz, is generated corresponding to the wavelength sweep of the output light (measurement light), and the light is photoelectrically converted by the photodetector 5 to the electric signal b. The wavelength (frequency) of the transmitted light is known. Accordingly, an oscillation wavelength (wavelength of the wavelength-swept measurement light) of the wavelength-tunable light source 10 can be obtained by use of the electric signal b, which has been obtained by the photoelectrical conversion, and the sweep signal a.

Subsequently, an optical circulator 13 directs the measurement light supplied from the wavelength-tunable light source 10 to be incident on an FBG 15 through a fiber 14. In addition, upon receipt of reflected light (reflection spectrum) reflected off of the FBG 15 and returned therefrom, the optical circulator 13 outputs the light to a photodetector (PD) 16. The photodetector 16 photoelectrically converts the reflected light to an electric signal c and outputs the electric signal c to the processing unit 17.

The processing unit 17 measures the reflection wavelength of the FBG 15 in accordance with the electric signal c received from the photodetector 16, the sweep signal "a" and electric signal b received from the wavelength-tunable light source 10.

An exemplary case is now assumed that the conventional FBG sensor system measures a reflection wavelength of a wavelength range (measurement wavelength range) of 1520 to 1580 nm for an FBG 15 having a reflection wavelength of 1550 nm. In this case, as shown in FIGS. 10A and 10B, light having a wavelength range (sweep wavelength range) of 1500 to 1600 nm inclusive of the measurement wavelength range is wavelength-swept to be a sine wave shape by the drive signal (sweep signal a) having a sweep period of 1.4 ms (714 Hz). Then, the light wavelength-swept to be the sine wave shape is directed to be continually incident on the fiber 14 as the measurement light.

A noise floor of the reflected light (reflection spectrum) of the measurement light returned by being reflected off of the FBG 15, is caused by the Rayleigh scattered light occurring in the fiber 14. The intensity of the Rayleigh scattered light is proportional to the intensity of the measurement light incident on the fiber 14. Accordingly, the signal-to-noise (S/N) ratio of the reflection spectrum of the FBG 15 is not dependant upon the intensity of the measurement light incident on the fiber 14.

Consequently, in the case where the measurement light shown in FIG. 10B is continuously input into the fiber 14, the S/N ratio of the reflection spectrum of the FBG 15 is represented by Equation (3) in accordance with a reflection spectrum intensity $P_F$ given by Equation (1) and Rayleigh scattered light intensity $P_R$ given by Equation (2) (provided that the reflectance of the FBG 15 is 100%):

$$P_F = P_0 e^{-2\alpha L} \quad (1)$$

$$P_R = RP_0(1-e^{-2\alpha L})/2 \quad (2)$$

$$S/N = P_F/P_R = 2e^{-2\alpha L}/\{R(1-e^{-2\alpha L})\} \quad (3)$$

where, $P_0$ denotes an intensity of the measurement light input into the fiber 14; L denotes a fiber length; $\alpha$ denotes a fiber attenuation factor; and R denotes a Rayleigh scattered light occurrence rate. In a case of a general optical communication fiber, $\alpha$ is 0.046/km (=0.2 dB/km) and R is 0.0022.

FIG. 11 shows, by way of a conventional example, calculated values of S/N ratios obtained from Equation (3) for the fiber length (L) and corresponding measurement values. As can be seen from FIG. 11, the S/N ratio is smaller as the fiber length is larger, and is 0 dB when the length is a range of about 60 km to 70 km. In practice, an S/N ratio in a range of about 10 dB to 20 dB is necessary to accomplish an accurate measurement of variations of the reflection wavelength (wavelength of the reflection spectrum) of the FBG 15. As a consequence, as seen from FIG. 11, a problem arises in that the measurable fiber length limit is restricted to about 30 km.

SUMMARY OF THE INVENTION

An object of the present invention is to provide an FBG sensor system that solves the above-described problem by using an optical pulse for measurement light incident on an FBG to reduce the influence of Rayleigh scattered light occurring in a fiber and that is capable of performing accurate measurement of the measurement object even when the fiber length to the FBG exceeds 80 km.

In order to achieve the object, the present invention provides items as summarized herebelow.

(1) An FBG sensor system including: a wavelength-tunable light source for oscillating light wavelength-swept or having undergone a wavelength sweep at a predetermined sweep period by using a semiconductor laser, the light including light in a predetermined wavelength range; a photodetector for operating in a manner that, upon receipt of reflected light of measurement light directed to be incident on an optical fiber including an FBG having reflection wavelength falling within a range of the wavelength sweep, the photodetector converts the reflected light to an electric signal; a processing unit for measuring the reflection wavelength of the FBG in accordance with the electric signal output from the photodetector; and optical pulse generator means including a pulse generator that generates a pulse having a predetermined period in synchronism with the sweep period, the optical pulse generator means being connected to the wavelength-tunable light source in order that the light from the wavelength-tunable light source is converted into an optical pulse formed of light in a predetermined wavelength range by using the pulse and the optical pulse is directed to be incident on the optical fiber. The sweep period is such that a receipt time of the reflected light relative to the optical pulse as the measurement light in the photodetector from the FBG is after termination of incidence of the optical pulse on the optical fiber. The predetermined period of the pulse is such that an incidence time for incidence of a next optical pulse following the optical pulse as the measurement light on the optical fiber is after receipt of the reflected light relative to the optical pulse in the photodetector from the FBG.

(2) An FBG sensor system in accordance with item (1), wherein a drive current of the semiconductor laser of the wavelength-tunable light source is turned on/off by the pulse generated by the pulse generator, whereby the optical pulse formed of the light in the predetermined wavelength range is emitted from the wavelength-tunable light source.

(3) An FBG sensor system in accordance with item (1), wherein the pulse generator means includes an optical switch for turning on/off the light that is emitted and incident on the FBG from the wavelength-tunable light source, and the optical switch is turned on/off by the pulse to thereby generate the optical pulse formed of the light in the predetermined wavelength range.

(4) An FBG sensor system in accordance with item (1), wherein the pulse generator means includes an optical amplifier that turns on/off for amplification of the light that is emitted and incident on the FBG from the wavelength-tunable light source, and the optical amplifier is turned on/off by the pulse to thereby generate the optical pulse formed of the light in the predetermined wavelength range.

(5) An FBG sensor system in accordance with any one of items (1) to (4), wherein the wavelength-tunable light source includes: the semiconductor laser having one of laser light emission facets AR-coated; a collimating lens for collimating light emitted from the AR-coated laser light emission facet of the semiconductor laser; a diffractive grating that receives collimated light emitted from the collimating lens and causes diffraction of the collimated light by an angle corresponding to a wavelength thereof; and a MEMS scanner including a reflector and reflector driving means, wherein, when diffracted light relative to the collimated light for incidence from the diffractive grating is reflected off of a reflecting surface of the reflector and is diffracted again by the diffractive grating, and the diffracted light thus obtained is directed to be incident on the semiconductor laser through the collimating lens, the diffracted light for incidence on the semiconductor laser is caused to become light of a desired wavelength, and the angle of the reflecting surface of the reflector is repetitiously varied at the predetermined sweep period by using the reflector driving means so that the desired wavelength including the predetermined wavelength range is reciprocally swept.

(6) An FBG sensor system in accordance with item (5), wherein the reflector of the MEMS scanner includes: fixed substrates; axial portions, respectively, extended with a predetermined width and length from edge portions of the fixed substrates and torsionally deformable along the direction of the length; and a reflecting plate that is connected in edge portions of their own to ends of the respective axial portions and that includes the reflecting surface on one surface side for reflecting diffracted light incident from the diffractive grating, and the reflector driving means of the MEMS scanner exerts a force on the reflecting plate in accordance with a drive signal of a frequency corresponding to a natural frequency of a portion including the axial portions of the reflector and the reflecting plate to thereby reciprocally rotate the reflecting plate at the predetermined sweep period corresponding to the natural frequency or an oscillation frequency close to the natural frequency.

As summarized above, according to the FBG sensor systems of items (1) to (4), the optical pulse formed of the light in the predetermined wavelength range is generated and is directed to be incident on the FBG as the measurement light. As such, as seen in FIG. 11 showing the comparison between two groups of measurement values (in the conventional example and inventive example cases), the influence of Rayleigh scattered light occurring in the fiber can be reduced, thereby to enable the S/N (signal to noise) not to deteriorate by the fiber length. Consequently, the measurement object can be accurately measured even when the fiber length to the FBG exceeds 80 km.

According to the FBG sensor system of any one of items (5) and (6), the MEMS scanner performs the reciprocal sweep of the wavelength-tunable light source, so that fast wavelength sweep can be performed, thereby to make it possible to increase the measurement speed.

BRIEF DESCRIPTION OF THE DRAWINGS

FIGS. 6A to 6E, respectively, are explanatory diagrams showing the relationship between measurement light and reflection spectrums in accordance with the embodiments of the invention;

FIGS. 10A and 10B, respectively, are explanatory diagrams of measurement light in accordance with a conventional example;

FIG. 11 is an explanatory diagram showing the relationship between fiber lengths and S/N ratios.

DESCRIPTION OF THE PREFERRED EMBODIMENTS

Embodiments of the present invention will be described below.

First Embodiment

Figure 1:
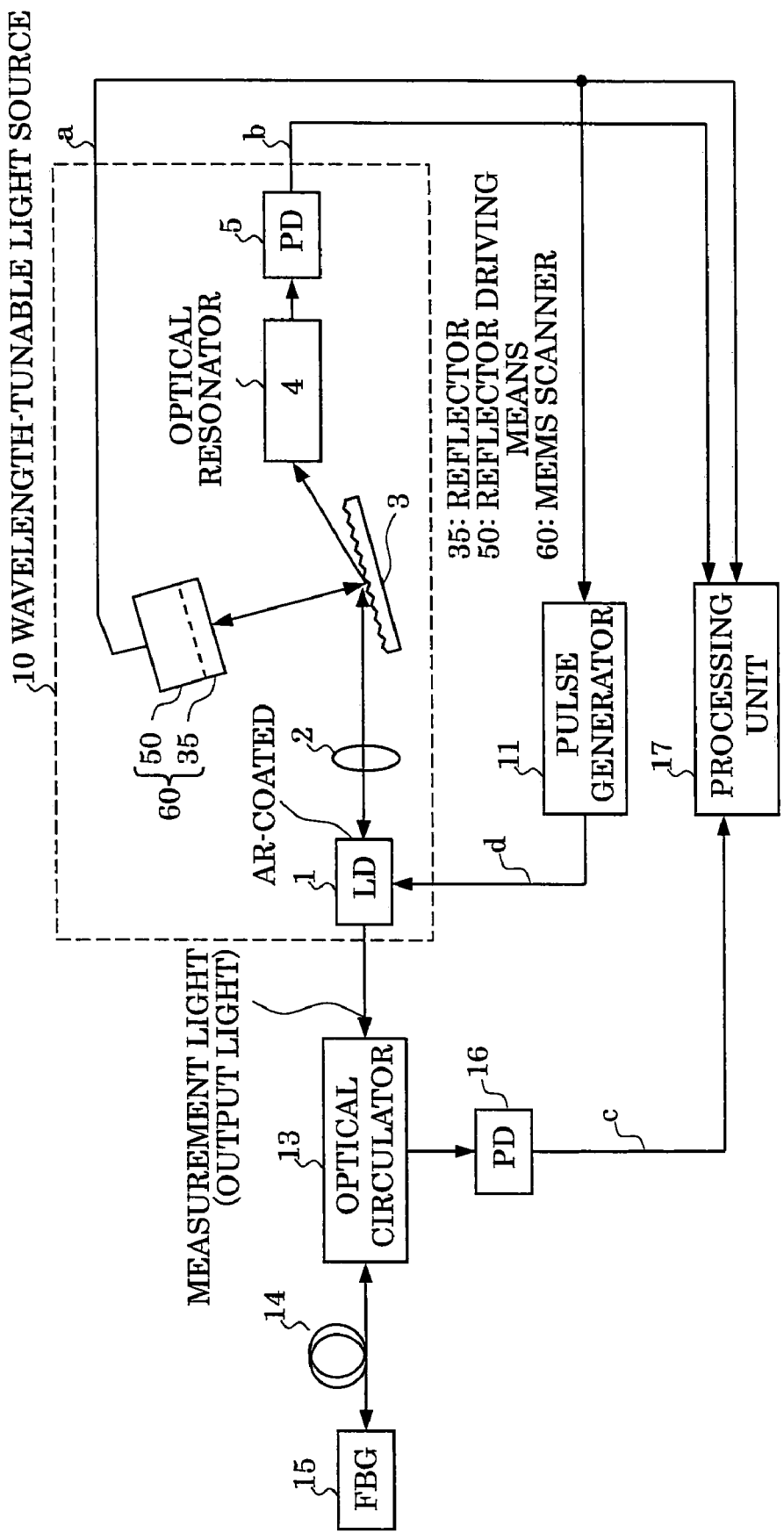
FIG. 1 is a diagram showing the configuration of a first embodiment of the present invention.

A first embodiment of the present invention will be described hereinbelow. FIG. 1 shows the configuration of an FBG sensor system of the first embodiment. In the drawing, like numerals refer to components corresponding to the conventional FBG sensor system described above. In a wavelength-tunable light source 10 of the first embodiment, light emitted from an AR-coated facet of a semiconductor laser (LD) 1 is converted by a collimating lens 2 to collimated light, and is then directed to be incident on a diffraction grating 3. Diffracted light of the incident light, which has been output by the diffractive grating 3, is directed to be incident on a MEMS scanner 60. The MEMS scanner 60 is configured from a reflector 35 and reflector driving means 50. An event is now assumed such that the diffracted light of the collimated light incident from the diffractive grating 3 is reflected off of a reflective surface of the reflector 35 and is diffracted again by the diffractive grating 3, and the diffracted light thus obtained is directed to be incident on the LD 1 through the collimating lens 2. In this event, the MEMS scanner 60 operates such that the diffracted light for incidence on the LD 1 is caused to become light of a desired wavelength. Further, the reflecting surface of the reflector 35 is reciprocally rotated in a predetermined sweep period by the reflector driving means 50 in the angle so that the desired wavelength including a predetermined wavelength range is reciprocally swept.

The above-described operation of the wavelength-tunable light source 10 is performed when a drive current of the LD 1 is turned on by a pulse d (described in detail below) generated by a pulse generator 11 and is set thereby to an oscillatory state. In addition, the reflector 35 and reflector driving means 50 constituting the MEMS scanner 60 will be described in more detail below with reference to FIGS. 4 and 5.

According to the configuration described above, when the drive current of the LD 1 is turned on by the pulse d, wavelength-swept light is oscillated and output from a non-AR-coated facet of the LD 1 to function as output light (measurement light). The reflector driving means 50 itself generates a drive signal (determining the wavelength range and the sweep period) to reciprocally rotate the angle of the reflective surface of the reflector 35, and outputs the signal as a sweep signal "a" to the pulse generator 11 and a processing unit 17.

Zero order light from the diffractive grating 3 is incident on an optical resonator 4 of an etalon or the like, and only light of a predetermined wavelength is transmitted therethrough. The transmitted light is then converted by a photodetector (PD) 5 to an electric signal b, and is then output to the processing unit 17. More specifically, transmitted light at a predetermined wavelength interval of, for example, 15 GHz, is generated corresponding to the wavelength sweep of the output light (measurement light), and the light is photoelectrically converted by the photodetector 5 to the electric signal b. The wavelength (frequency) of the transmitted light is known. Accordingly, an emission wavelength (wavelength of the wavelength-swept measurement light) of the wavelength-tunable light source 10 can be obtained by use of the electric signal b, which has been obtained by the photoelectric conversion, and the sweep signal "a".

As described above, according to the wavelength-tunable light source 10 shown in FIG. 1, the light emitted from the AR-coated facet of the LD 1 is converted by the collimating lens 2 to collimated light, and is then directed to be incident on the diffractive grating 3. However, a converging lens and an optical fiber (or simply "fiber," hereinbelow) can be provided between the LD 1 and the collimating lens 2. Thereby, the light emitted from the AR-coated facet of the LD 1 is converged by the converging lens and directed to be incident on the fiber, the light having passed through the fiber is converted by the collimating lens 2, and the collimated light is directed to be incident on the diffractive grating 3. Further, in the wavelength-tunable light source 10 shown in FIG. 1, although the light emitted from the non-AR-coated facet of the LD 1 is produced as the output, the zero order light of the diffractive grating 3 can be split by an optical coupler to produce outputs.

Subsequently, in accordance with the sweep signal "a" from the wavelength-tunable light source 10, the pulse generator 11 generates a pulse d of a predetermined period. The pulse d is used to direct light in a predetermined wavelength range, which is oscillated by the wavelength-tunable light source 10, to be incident on an FBG 15 as measurement light. More specifically, reference is made to the case described in "Description of the Related Art". That is, in relation to FIGS. 10A and 10B for measuring the reflection wavelength of the FBG 15 having a reflection wavelength of 1550 nm, the measurement wavelength range is from 1520 nm to 1580 nm, the sweep wavelength range is from 1500 nm to 1600 nm, and the sweep period is 1.4 ms (714 Hz). In this case, a pulse d of a 0.3 ms width, and 2.8 ms (357 Hz) period (see FIG. 6C) for causing thick line portions shown in FIG. 6B is generated as measurement light in synchronism with a sweep signal "a" (see FIG. 6A). Then, the drive current of the LD 1 is turned on/off by the pulse d, and light (which can be called "optical pulse") formed by the wavelength sweep performed for the range of from 1520 nm to 1580 nm only in a duration of 0.3 ms of the 2.8 ms period is emitted as measurement light from the wavelength-tunable light source 10.

An optical circulator 13 directs the optical pulse, which has been emitted as the measurement light from the wavelength-tunable light source 10, to be incident on the FBG 15 through a fiber 14. In addition, upon receipt of reflected light (reflection spectrum) of the optical pulse (measurement light) reflected off of the FBG 15 and returned therefrom, the optical circulator 13 outputs the light to a photodetector (PD) 16. The photodetector 16 converts the reflected light to an electric signal c and outputs the electric signal c to the processing unit 17.

The processing unit 17 measures the reflection wavelength of the FBG 15 in accordance with the electric signal c received from the photodetector 16, the sweep signal "a" and electric signal b received from the wavelength-tunable light source 10.

The S/N ratio of the reflection spectrum of the FBG 15 will be described hereinbelow. With reference to FIGS. 6D and 6E, $T_S$ denotes an emission start time of measurement light and $T_E$ denotes an emission end time thereof. In this case, Expression (4) below represents the relation between an intensity $P_R$ and time t of pulse-shaped Rayleigh scattered light in the event that pulse-shaped measurement light (optical pulse) between $T_S$ and $T_E$ is incident on the fiber 14 of a length L:

$$P_R = (RP_0/2)[\exp\{-(\alpha c/n)(t-T_E)\} - \exp\{-(\alpha c/n)(t-T_S)\}] \quad (4)$$

where, $P_0$ denotes an intensity of the measurement light between $T_S$ and $T_E$, incident on the fiber 14; n denotes a refraction index of the fiber; and c denotes a light velocity in vacuum. It can be known from Expression (4), the Rayleigh scattered light attenuates over the time.

Further, $\lambda_F$ denotes the reflection wavelength (1550 nm (described above)) of the FBG 15, and $T_F$ denotes the time when the wavelength $\lambda_F$ is emitted as measurement light. In this case, Expression (5) below represents the time $T_D$ when the reflection spectrum of the measurement light is detected by the PD 16 after the measurement light of the wavelength $\lambda_F$ is reflected off of the FBG 15 through the fiber 14 of the length L.

$$T_D = T_F + 2nL/c \quad (5)$$

An intensity $P_F$ of the reflection spectrum detected by the photodetector 16 is given by Expression (6) below. Further, with Expression (5) assigned as $t=T_D=T_F+2nL/c$ to Expression (4), the intensity $P_R$ of the Rayleigh scattered light is obtained by Expression (7) below.

$$P_F = P_0 e^{-2\alpha L} \quad (6)$$

$$P_R = (RP_0/2)e^{-2\alpha L}[\exp\{-(\alpha c/n)(T_F-T_E)\} - \exp\{-(\alpha c/n)(T_F-T_S)\}] \quad (7)$$

FIG. 6E shows the relation between the reflection spectrum detected by the photodetector 16 and the Rayleigh scattered light in accordance with Equations (4) to (7).

Consequently, the S/N ratio is represented as Expression (8) below.

$$S/N = P_F/P_R \quad (8)$$
$$= 2/[R[\exp\{-(\alpha c/n)(T_F-T_E)\} - \exp\{-(\alpha c/n)(T_F-T_S)\}]]$$

From Equation (8), it can be known that the S/N ratio is not dependent on the fiber length (L), but is constant.

FIG. 11 shows calculated values of the S/N ratio obtained from Expression (8) for the fiber length (L) and corresponding measurement values by the present invention with respect to the fiber length (L). From FIG. 11, it can be known that, as a result of reduction of the influence of the Rayleigh scattered light, a reduction of the S/N ratio resulting from the fiber length is restrained, whereby a S/N ratio of 20 dB or higher can be secured even in the case of a fiber length of 80 km or larger.

For detection of the reflection spectrum of the FBG 15, the sweep period of the sweep signal "a" (FIG. 6A) and the period of the pulse d (FIG. 6C) need to be determined as described hereinbelow in order to reduce the influence of the Rayleigh scattered light occurring in the fiber. The sweep period of the sweep signal "a" is determined such that the receipt time ($T_D$ in FIG. 6E) of the reflected light relative to the optical pulse ($S_0$ in FIG. 6D) as the measurement light in the photodetector 16 from the FBG 15 is after termination of incidence of the optical pulse on the fiber 14 ($T_E$ in FIG. 6E). The period of the pulse d is determined such that the incidence time ($T_{S1}$ in FIG. 6E) for incidence of the next optical pulse ($S_1$ in FIG. 6D) following the optical pulse ($S_0$ in FIG. 6D) as the measurement light on the fiber 14 is after the receipt of the reflected light relative to the optical pulse ($S_0$ in FIG. 6E) in the photodetector 16 from the FBG 15 ($T_D$ in FIG. 6E).

Figure 4:
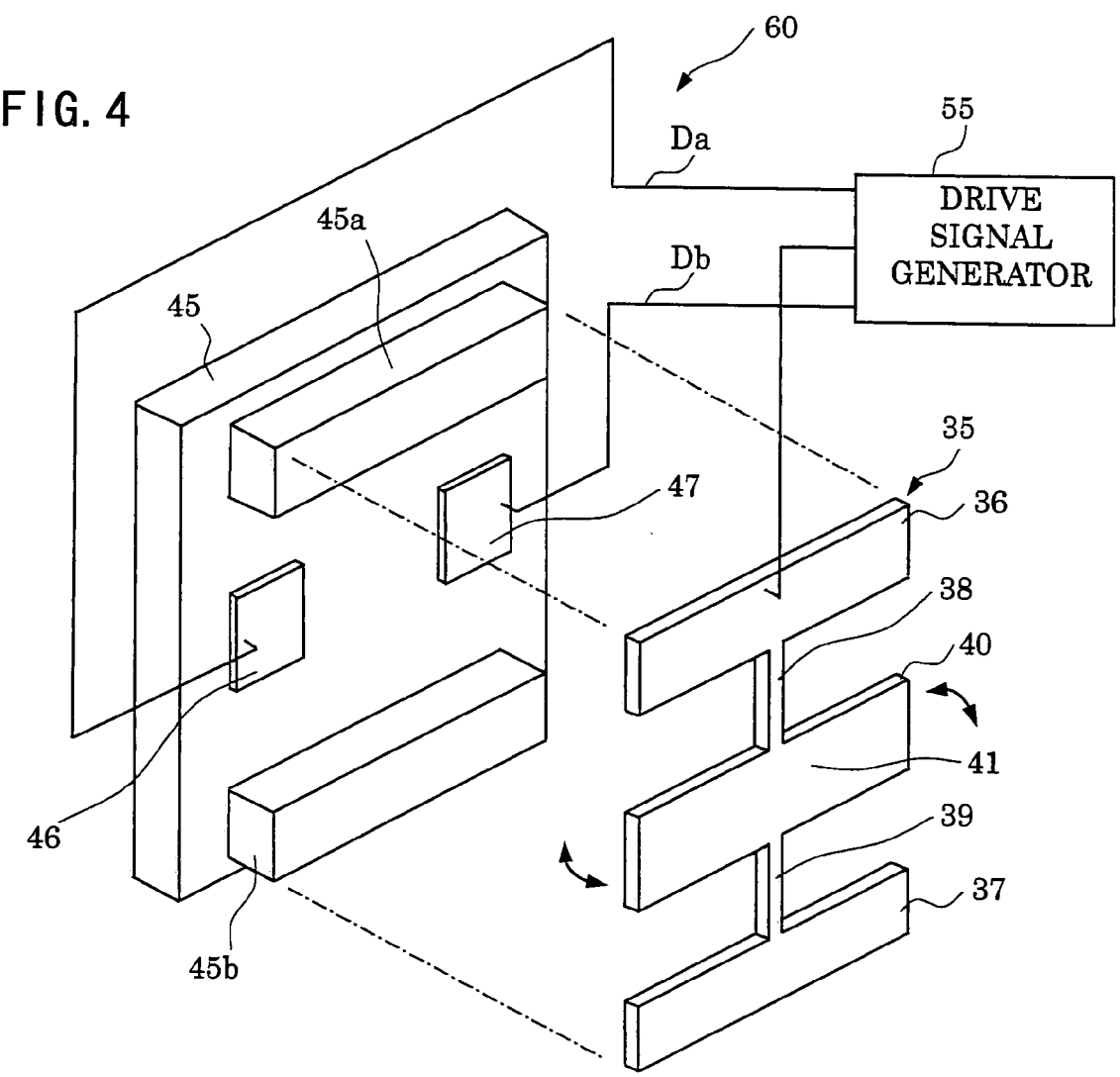
FIG. 4 is an explanatory exploded perspective view of a MEMS scanner.

The reflector 35 and reflector driving means 50 of the MEMS scanner 60, which constitutes a part of the wavelength-tunable light source 10, will now be described in detail herebelow. With reference to FIG. 4, the reflector 35 includes a pair of fixed substrates 36 and 37, a pair of axial portions 38 and 39, and a reflecting plate 40. The pair of fixed substrates 36 and 37, respectively, have a laterally long rectangle shapes and are arranged parallel to each other. The pair of axial portions 38 and 39, respectively, are formed with a predetermined width and length to extend from the centers of long-side edge portions of the pair of fixed substrates 36 and 37 along a direction perpendicular to the fixed substrates 36 and 37. Further, the axial portions 38 and 39 are each torsionally deformable along a length direction thereof. The reflecting plate 40 has a laterally long rectangle shape, is connected in the central portion of one long-side edge portion to the end of the axial portion 38, and is connected to in the central portion of the other long-side edge portion to the end of the axial portion 39. The reflecting plate 40 is thus supported in the central portion thereof by the torsionally deformable axial portions 38 and 39. Accordingly, the reflecting plate 40 is able to rotate with respect to the fixed substrates 36 and 37 about a central axis along a line connecting between the axial portions 38 and 39. A natural frequency $f_0$ of a portion including the axial portions 38 and 39 and reflecting plate 40 is determined by, for example, the shape and mass of the reflecting plate 40 itself and a spring constant of the respective axial portions 38, 39.

A reflecting surface 41 for reflecting the light is formed on one surface side of the reflecting plate 40. The reflecting surface 41 can be formed by, for example, mirror-finishing of the reflecting plate 40 itself, or vapor deposition or adhesion of a film (not shown) having a high reflectance. The reflector 35 is integrally cut by a process such as an etching process from a thin semiconductor substrate, and has high electrical conductivity imparted with a metal film vapor deposition.

A support substrate 45 is formed from a material having electric insulation. Supports 45a and 45b projecting forward are formed in upper and lower portions, respectively, of the support substrate 45. The fixed substrates 36 and 37 of the reflector 35 are fixed to the upper and lower supports 45a and 45b in contact therewith, respectively. Further, electrode plates 46 and 47 are formed by patterning in two end portions in a central portion of the one surface side of the support substrate 45. The electrode plates 46 and 47 confront both end portions, respectively, of the reflecting plate 40 of the reflector 35. With a drive signal generator 55 (described further below), the electrode plates 46 and 47 form the reflector driving means 50 (see FIG. 1). The drive signal generator 55 applies an electrostatic force alternately and periodically to the both end portions of the reflecting plate 40, thereby to cause the reflecting plate 40 to reciprocally rotate about a line (rotation axis) connecting between the axial portions 38 and 39. The rotation axis of the reflecting plate 40 is set parallel to diffraction grooves of the diffractive grating 3 (see FIG. 1). The reflector 35 thus configured receives the diffracted light incoming from the diffractive grating 3 on the reflecting surface 41 of the reflecting plate 40. Then, the reflector 35 directs the reflected light to be incident on the diffractive grating 3 to thereby to cause re-diffraction.

Figure 5:
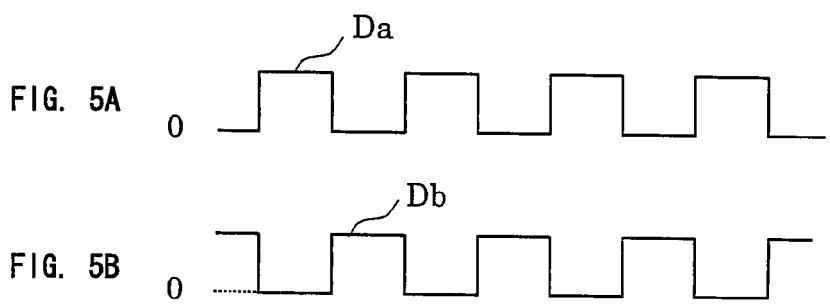
FIGS. 5A and 5B, respectively, are explanatory diagrams showing drive signals.

The drive signal generator 55, which partly constitutes the reflector driving means 50 (see FIG. 1), operates as follows. For example, as shown in FIGS. 5A and 5B, the drive signal generator 55 applies drive signals Da and Db to the electrode plates 46 and 47, respectively, on the basis of a potential of the reflector 35. The drive signals Da and Db each has a frequency corresponding to the natural frequency $f_0$ (or a frequency corresponding to an oscillation frequency close to the natural frequency $f_0$), and have phases 180-degree shifted from each other. Thereby, an electrostatic force (attractive force) is alternately and periodically supplied between the electrode plate 46 and the one-end side of the reflecting plate 40 and between the electrode plate 47 and the other-end side of the reflecting plate 40. As a consequence, the reflecting plate 40 is reciprocally rotated within a predetermined angle range at either the natural frequency $f_0$ or the oscillation frequency close thereto. Further, according to the drive signal generator 55, any one of the two drive signals Da and Db is applied as the sweep signal "a" to the pulse generator 11 and the processing unit 17 (see FIG. 1). In FIG. 5, a case is shown in which the two drive signals Da and Db are each a rectangular wave (square waveform) of a 50% duty ratio (cycle). However, the duty cycle of the respective signals can be 50% or less, and the waveform thereof is not limited to the square waveform, but can be, for example, a sine or triangular waveform.

Thus, the MEMS scanner 60 (see FIG. 1) is configured to include the reflector 35 and the reflector driving means 50. The reflector 35 is configured to include the pair of fixed substrates 36 and 37, and the axial portions 38 and 39, and the reflecting plate 40. The fixed substrates 36 and 37, respectively, extend with a predetermined width and length from the fixed substrates 36 and 37 to be torsionally deformable along the length direction thereof. The reflecting plate 40 is connected at the edge portions of its own to the ends of the axial portions 38 and 39 and is formed into the shape symmetric with respect to the axial portions 38 and 39, and has the reflecting surface 41 formed on the one surface side thereof. In the configuration, a force is exerted on the reflecting plate 40 through the drive signals of the frequency corresponding to the natural frequency $f_0$ of the portion including the axial portions 38 and 39 and reflecting plate 40 of the reflector 35. Thereby, the reflecting plate 40 is reciprocally rotated at either the natural frequency $f_0$ or the oscillation frequency close thereto.

Consequently, the reflecting plate 40 can be reciprocally rotated at high velocity by a small electrical energy. Further, the rotational center exists in the interior (central portion in the present case) of the reflecting plate 40, which enables to increase the variation amount of the reflection angle of the incident light on the reflecting surface 41 of the reflecting plate 40. The spring constant of the respective axial portions 38, 39 is determined in accordance with parameters of the length, width, and material, and the like thereof, and the natural frequency $f_0$ is determined in accordance with the spring constant and the shape, thickness, material, and the like of the reflecting plate 40. Consequently, the natural frequency $f_0$ can be set within the range of from several 100 Hz to several 10 kHz by selection of parameters such as described above.

In the wavelength-tunable light source 10 (see FIG. 1) of the FBG sensor system according to the present invention, the MEMS scanner 60 is thus configured by using or to include the above-described reflector 35 and reflector driving means 50, so that the sweep speed can be increased (several tens of kHz maximum).

While having described above in conjunction with FIG. 4, the reflector 35 is formed from the material having high electric conductivity. However, the reflector 35 may be formed from a material having low electric conductivity. In this case, the configuration may be such that electrode plates confronting the electrode plates 46 and 47 are provided on both sides (or, entire surface) of the reverse surface of the reflecting plate 40 with respect to the reflecting surface 41. Further, electrode plates are provided also on the back surface sides of the fixed substrates 36 and 37, in which the electrode plates are connected by patterns or the like. Furthermore, electrode plates for contact with the electrode plates on the back surface side of the fixed substrates 36 and 37 are formed by patterning on the surfaces of the supports 45a and 45b of the support substrate 45, in which at least one of them is connected as a reference potential line to the drive signal generator 55.

Further, one-end sides or both ends of the respective fixed substrates 36 and 37 may be connected one another, thereby to form the fixed substrate into a shape of a U-shaped frame or rectangular frame. Also the shape of the reflecting plate 40 is arbitrary, such that the shape may be any one of not only the laterally long rectangular shape, but also circular, ellipsoidal, lengthy circular, lozenge, square, polygonal, and the like shapes. Further, either a large opening or a large number of small openings may be provided inside of the reflecting plate 40 in order to reduce the air resistance during high speed reciprocal rotation.

According to FIG. 4 described above, the two electrode plates 46 and 47 confronting the both end portions, respectively, of the reflecting plate 40 of the reflector 35 are provided. However, the electrostatic force may be applied only by one of the electrode plates (only by the electrode plate 46, for example). Further, the driving method may be such that the reflecting plate 40 is reciprocally rotated by an electromagnetic force instead of the electrostatic force described above. In this case, for example, coils are used in place of the electrode plates 46 and 47, and either magnets or coils are provided on the both end portions of the reflecting plate 40. Thereby, the reflecting plate 40 is reciprocally rotated by using attractive and repellent forces of magnetic fields occurring between the coils or between the coils and the magnets.

Instead of the above-described method of imparting the electrostatic or electromagnetic force directly to the reflecting plate 40, the method can be as described hereinbelow. Oscillations of the natural frequency $f_0$ or close thereto are exerted on the entirety of the reflector 35 by using an ultrasonic oscillator or the like, and oscillations thus generated are transferred to the reflecting plate 40 to thereby reciprocally rotate the reflecting plate 40. In this case, the oscillator is provided to, for example, the back surface side or support 45a, 45b of the support substrate 45, whereby the oscillations can be efficiently transferred to the reflecting plate 40.

Second Embodiment

Figure 2:
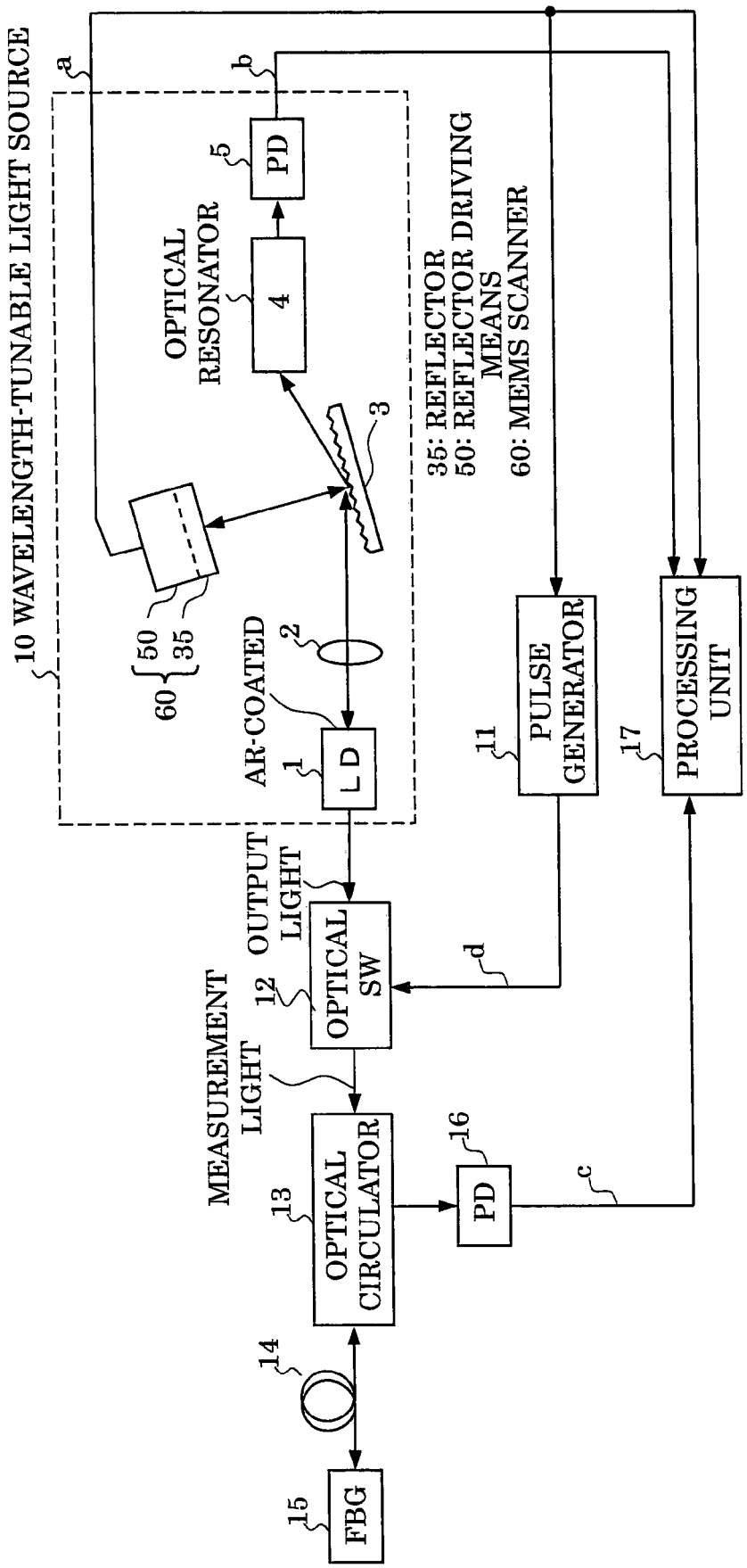
FIG. 2 is a diagram showing the configuration of a second embodiment of the present invention.

FIG. 2 shows the configuration of an FBG sensor system according to a second embodiment of the present invention. As described above, in the first embodiment shown in FIG. 1, the optical pulse is generated as measurement light in the manner that the pulse d output from the pulse generator 11 is used to turn on/off the drive current of the LD 1 of the wavelength-tunable light source 10. According to the second embodiment, an optical switch (optical SW) 12 is provided between the wavelength-tunable light source 10 and the optical circulator 13. The optical switch 12 is turned on/off by the pulse d output from the pulse generator 11, thereby to generate the optical pulse as the measurement light from output wavelength-swept output light of the wavelength-tunable light source 10. The second embodiment is different from the first embodiment only in the above-described respect, and others are the same as the first embodiment. Therefore, a detailed description of the second embodiment is omitted herein.

Third Embodiment

Figure 3:
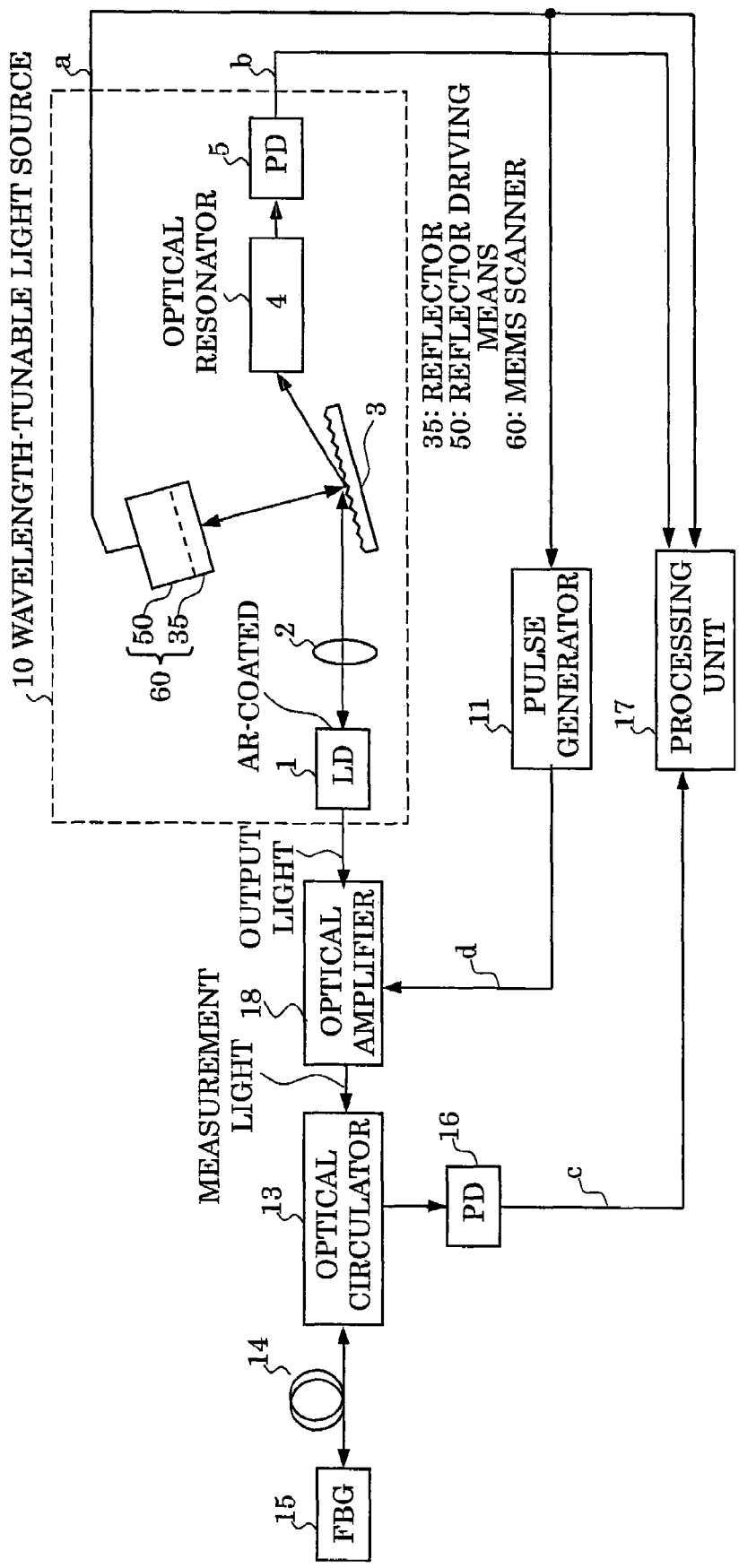
FIG. 3 is a diagram showing the configuration of a third embodiment of the present invention.

FIG. 3 shows the configuration of an FBG sensor system according to a third embodiment of the present invention. As described above, in the first embodiment shown in FIG. 1, the optical pulse is generated as measurement light in the manner that the pulse d output from the pulse generator 11 is used to turn on/off the drive current of the LD 1 of the wavelength-tunable light source 10. According to the third embodiment, an optical amplifier 18 is provided between the wavelength-tunable light source 10 and the optical circulator 13. The function of amplification of the light passing through the optical amplifier 18 is turned on/off by the pulse d output from the pulse generator 11, thereby to generate the optical pulse as the measurement light from output wavelength-swept output light of the wavelength-tunable light source 10. The third embodiment is different from the first embodiment only in the above-described respect, and others are the same as the first embodiment. Therefore, a detailed description of the second embodiment is omitted herein.

In the respective first to third embodiments, the wavelength-tunable light source 10, which is capable of the fast wavelength sweep, is a light source of an external resonator type configured by combination of the LD 1, the diffractive grating 3, and the MEMS scanner 60. However, the present invention is not limited to this type, but may be other types. One example is a light source of an external resonator type configured by combination of an LD, a single-cavity wavelength-tunable band pass filter, and a reflecting mirror (as disclosed in Japanese Patent Application Laid-Open No. 2005-37762, for example). In this case, the wavelength sweep is carried out in the manner that an applied voltage for tuning a transmission wavelength of the single-cavity wavelength-tunable band pass filter is swept at high speed.

Fourth Embodiment

Figure 7:
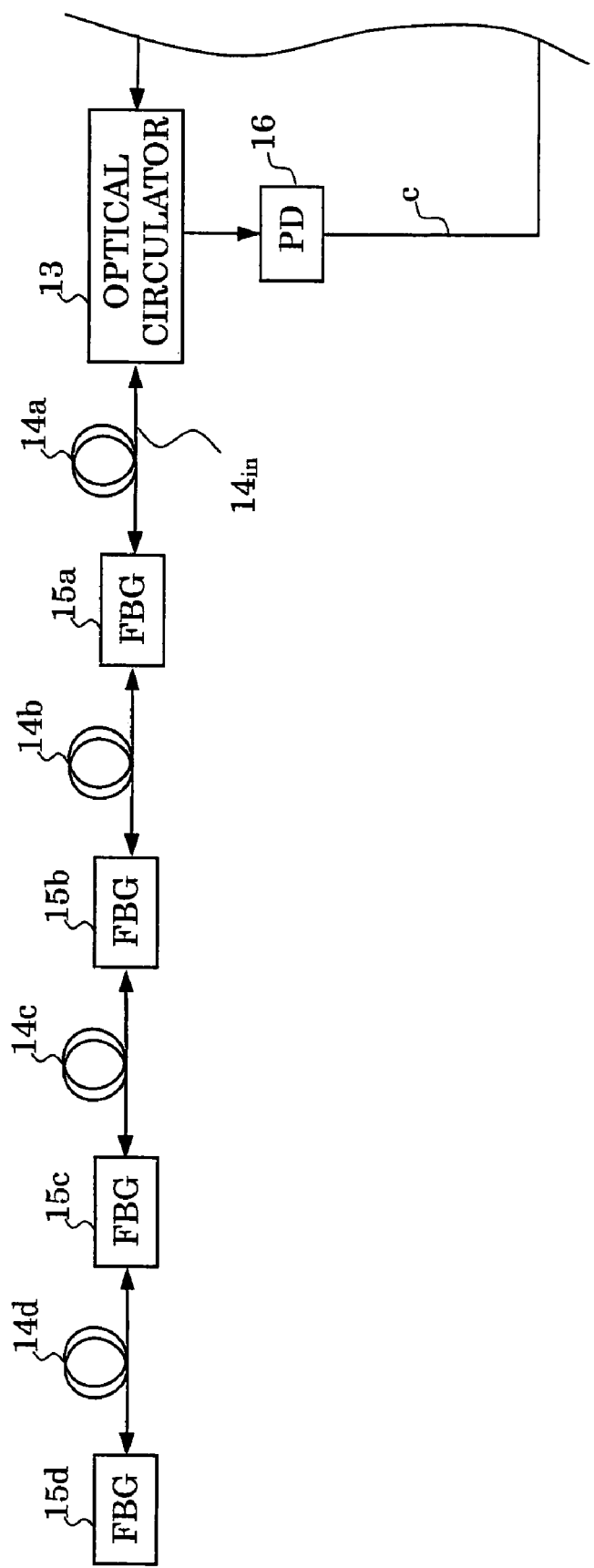
FIG. 7 is a diagram showing the configuration of a fourth embodiment of the present invention.

FIG. 7 shows the configuration of an FBG sensor system according to a fourth embodiment of the present invention. The first to third embodiments have each been described with reference to the configuration including the single FBG. However, the configuration of each of the first to third embodiments can, of course, be such that, as shown in FIG. 7 (only showing an extracted portion of the optical circulator 13, PD 16, fiber 14, and FBG 15 shown in FIGS. 1 to 3), a plurality of FBGs 15a to 15d are series connected at predetermined distance intervals by using fibers 14a to 14d. In this case, the configuration can be formed such that the reflection wavelengths of the respective FBGs are different from one another, whereby a reflection wavelength can be identified from which one of the FBGs it is reflected.

Figure 8:
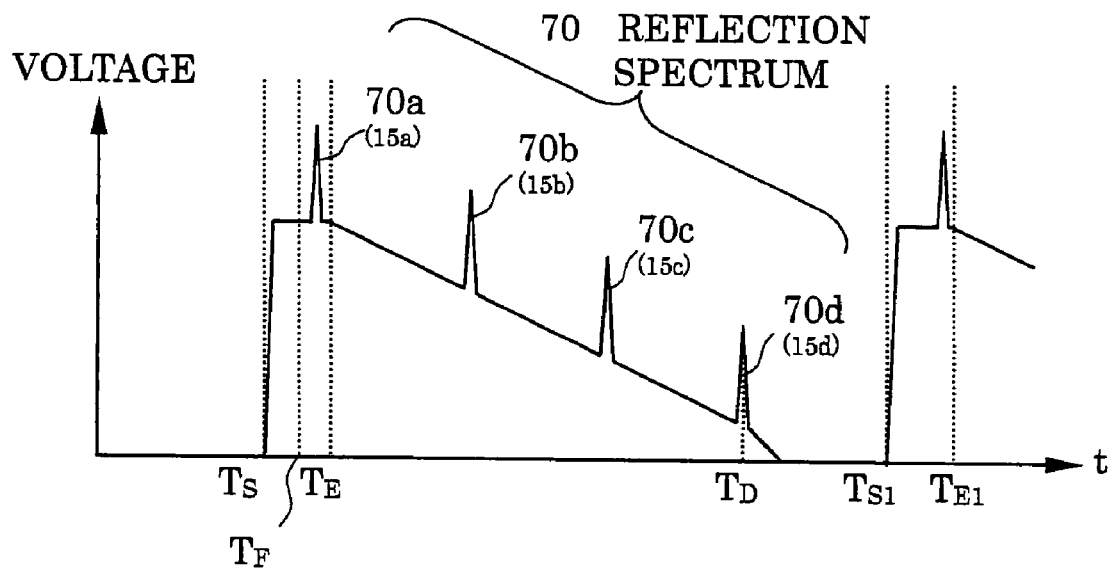
FIG. 8 is an explanatory diagram showing the relationship between measurement light and reflection spectrums in accordance with the fourth embodiment of the invention.

FIG. 8 shows an exemplary diagram of the relationship between reflection spectrums and Rayleigh scattered light in such an embodiment including a plurality of FBGs. The example corresponds to FIG. 6E described above and has four reflection spectrums 70a to 70d.

The reflection spectrum 70a is the one obtained in the case that the distance from an incident portion $14_{in}$ of the fiber 14a to the FBG 15a is short (1 km, for example). In this case, reflected light is received during incidence of an optical pulse $S_0$ (measurement light). The reflection spectrums 70b to 70d, respectively, have been received from the FBGs 15b to 15d series connected at predetermined distance intervals (20 km, 40 km, and 60 km from the incident portion $14_{in}$, for example).

In the configuration as described above, the sweep period of the sweep signal "a" can be determined such that the receipt time ($T_D$ in FIG. 8) of the reflected light relative to the optical pulse ($S_0$ in FIG. 6D) as the measurement light in the photodetector 16 from the FBG 15d is after termination of incidence of the optical pulse on the fiber 14a ($T_E$ in FIG. 8). The period of the pulse d can be determined such that the incidence time ($T_{S1}$ in FIG. 8) for incidence of the next optical pulse ($S_1$ in FIG. 6D) following the optical pulse ($S_0$ in FIG. 6D) as the measurement light on the fiber 14a is after the receipt of the reflected light relative to the optical pulse ($S_0$ in FIG. 6E) in the photodetector 16 from the FBG 15d ($T_D$ in FIG. 8). More specifically, a receipt time $T_D$ of the reflected light from the FBG 15d that is located farthest from the incident portion $14_{in}$ of the fiber 14a may be used as a reference to determine the sweep period of the sweep signal "a" and the period of the pulse d.

Figure 9:
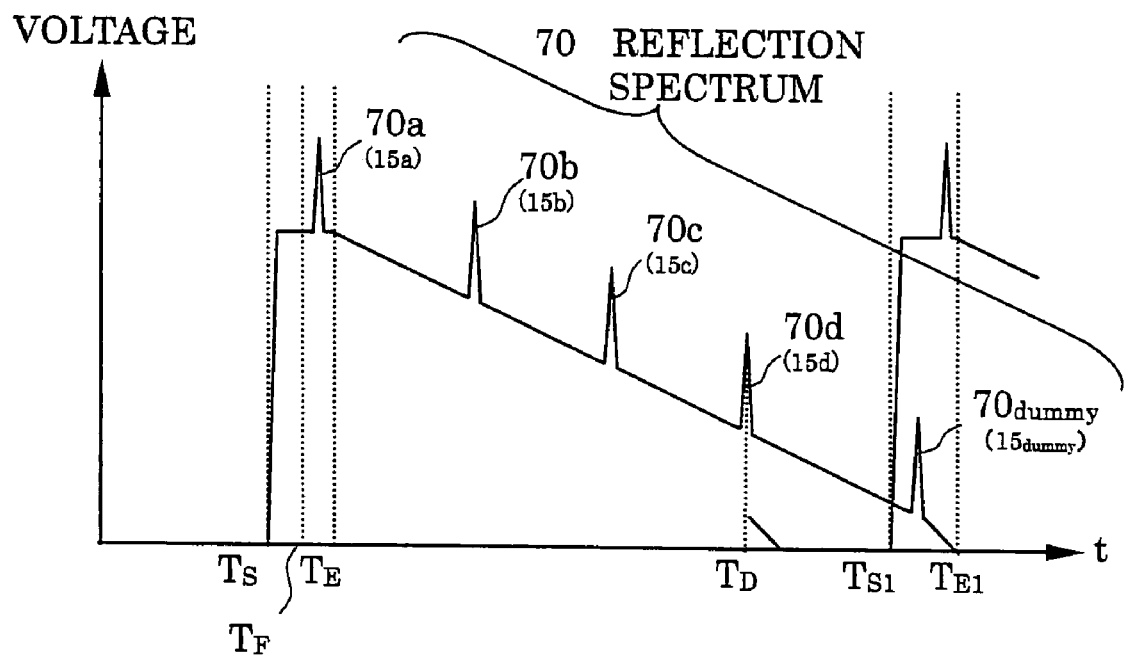
FIG. 9 is another explanatory diagram showing the relationship between measurement light and reflection spectrums in accordance with the fourth embodiment of the invention.
Figure 12:
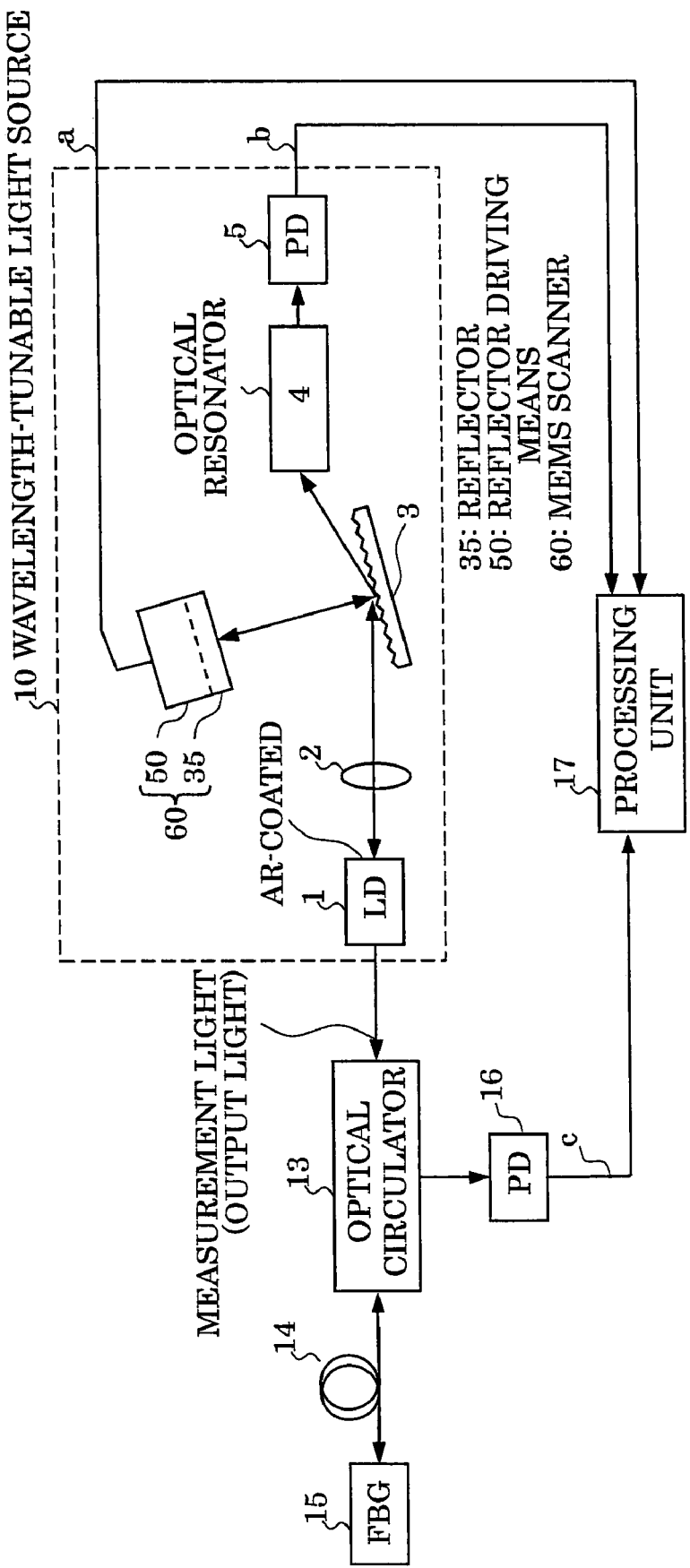
FIG. 12 is a diagram showing the configuration of the conventional example.

However, the present invention is not limited to the above. The determination can be made based on, as a reference, a receipt time $T_D$ of reflected light from substantially the farthest FBG For example, in the example shown in FIG. 9, an FBG $15_{dummy}$ is further provided as a dummy (FBG), which is not actually used as a sensor, after the FBG 15d, in which the next optical pulse $S_1$ is incident on the fiber 14a prior to the photodetection of a reflection spectrum $70_{dummy}$ from the FBG $15_{dummy}$. More specifically, the receipt time $T_D$ of the reflected light received from the FBG 15d (that is, not the farthest FBG), one-unit previous or immediately previous to the farthest FBG $15_{dummy}$, is used as a reference to determine the sweep period of the sweep signal "a" and the period of the pulse d. Even in the example of the embodiment, the FBG 15d functioning as a sensor is substantially the farthest FBG, and hence the configuration also is included in the technical scope of the present invention.

While the invention has been described with reference to the preferred embodiments, it will be understood by those skilled in the art having reference to the specification and drawings that various modifications and alternatives are possible therein without departing from the spirit and scope of the invention.

What is claimed is:

1. A Fiber Bragg Grating (FBG) sensor system comprising:
   a wavelength-tunable light source for outputting light wavelength-swept at a predetermined sweep period by using a semiconductor laser, the light including light in a predetermined wavelength range;
   a photodetector for operating in a manner that, upon receipt of reflected light of measurement light directed to be incident on an optical fiber including an FBG having reflection wavelength falling within the range of the wavelength sweep, the photodetector converts the reflected light to an electric signal;
   a processing unit for measuring the reflection wavelength of the FBG in accordance with the electric signal output from the photodetector; and
   optical pulse generator means including a pulse generator that generates a pulse having a predetermined period in synchronism with the sweep period, the optical pulse generator means being connected to the wavelength-tunable light source in order that the light from the wavelength-tunable light source is converted into an optical pulse formed of light in the predetermined wavelength range by using the pulse and the optical pulse is directed to be incident on the optical fiber,
   wherein
   the sweep period is such that a receipt time of the reflected light relative to the optical pulse as the measurement light in the photodetector from the FBG is after termination of incidence of the optical pulse on the optical fiber, and
   the predetermined period of the pulse is such that an incidence time for incidence of a next optical pulse following the optical pulse as the measurement light on the optical fiber is after receipt of the reflected light relative to the optical pulse in the photodetector from the FBG.

2. The FBG sensor system according to claim 1, wherein a drive current of the semiconductor laser of the wavelength-tunable light source is turned on/off by the pulse generated by the pulse generator, whereby the optical pulse formed of the light in the predetermined wavelength range is emitted from the wavelength-tunable light source.

3. The FBG sensor system according to claim 1, wherein the pulse generator means includes an optical switch for turning on/off the light that is emitted and incident on the FBG from the wavelength-tunable light source, and the optical switch is turned on/off by the pulse to thereby generate the optical pulse formed of the light in the predetermined wavelength range.

4. The FBG sensor system according to claim 1, wherein the pulse generator means includes an optical amplifier that turns on/off amplification of the light that is emitted and incident on the FBG from the wavelength-tunable light source, and the optical amplifier is turned on/off by the pulse to thereby generate the optical pulse formed of the light in the predetermined wavelength range.

5. The FBG sensor system according to any one of claims 1 to 4, wherein the wavelength-tunable light source includes:
   the semiconductor laser having one of laser light emission facets AR-coated;
   a collimating lens for collimating light emitted from the AR-coated laser light emission facet of the semiconductor laser;
   a diffractive grating that receives collimated light emitted from the collimating lens and causes diffraction of the collimated light by an angle corresponding to a wavelength thereof; and
   a MEMS scanner including a reflector and reflector driving means, wherein, when diffracted light relative to the collimated light for incidence from the diffractive grating is reflected off of a reflecting surface of the reflector and is diffracted again by the diffractive grating, and the diffracted light thus obtained is directed to be incident on the semiconductor laser through the collimating lens, the diffracted light for incidence on the semiconductor laser is caused to become light of a desired wavelength, and the angle of the reflecting surface of the reflector is repetitiously varied at the predetermined sweep period by using the reflector driving means so that the desired wavelength including the predetermined wavelength range is reciprocally swept.

6. The FBG sensor system according to claim 5, wherein the reflector of the MEMS scanner includes: fixed substrates; axial portions, respectively, extended with a predetermined width and length from edge portions of the fixed substrates and torsionally deformable along the direction of the length; and a reflecting plate that is connected in edge portions of its own to ends of the respective axial portions and that includes the reflecting surface on one surface side for reflecting diffracted light incident from the diffractive grating, and
the reflector driving means of the MEMS scanner exerts a force on the reflecting plate in accordance with a drive signal of a frequency corresponding to a natural frequency of a portion including the axial portions of the reflector and the reflecting plate to thereby reciprocally rotate the reflecting plate at the predetermined sweep period corresponding to the natural frequency or an oscillation frequency close to the natural frequency.

* * * * *